United States Patent Office 3,262,914
Patented July 26, 1966

3,262,914
SULFONATE-CARBOXYLATE COPOLYMERS
Eugene P. Goldberg, Highland Park, and Frank Scardiglia, Arlington Heights, Ill., assignors to Borg Warner Corporation, Chicago, Ill., a corporation of Illinois
No Drawing. Filed Mar. 16, 1965, Ser. No. 440,235
2 Claims. (Cl. 260—49)

This invention relates to new linear polyester copolymers. More specifically, this invention is directed to aromatic carboxylate-sulfonate polyester copolymers derived from 2,2-bis-(4-hydroxyphenyl)-propane (bisphenol-A), isophthalyl chloride, terephthayl chloride, and 4,4'-biphenyldisulfonyl chloride. This application is a continuation-in-part of the copending applications S.N. 175,323 entitled, "Resinous Compositions," filed February 23, 1962 and S.N. 272,853 entitled, "Resinous Compositions," filed April 15, 1963, both of which are assigned to the assignee of the present invention and now abandoned.

Low molecular weight polyesters derived from diphenols, dicarboxylic acid chlorides and disulfonic acid chlorides are known in the art and have been disclosed by Wagner (see U.S. Patent 2,035,578). Higher molecular weight aromatic polysulfonate homopolymers are also known (see Belgian Patent 565,478). High molecular weight aromatic polycarboxylates have also been noted in the literature (see Conix, Ind. Eng. Chem., volume 51, page 147, 1959). Additionally, there are a large variety of copolymers noted in the literature including particularly disphenol-A isophthalate-terephthalate copolymers (see U.S. Patent 3,133,898) and aromatic sulfonate-carboxylate copolymers (see Belgian Patent 585,882). While the above-mentioned polymers demonstrate a wide variety of properties, some of which are of value in certain commercial applications, they generally lack combinations of desirable properties required to promote widespread use in the plastics industry. More versatile linear condensation polymers include the novel classes of aromatic polysulfonate copolymers derived from diphenols and mixed aromatic disulfonyl chlorides disclosed and claimed in application S.N. 80,014 filed January 3, 1961 and aromatic polysulfonate copolymers derived from aromatic disulfonyl chlorides and mixed diphenols disclosed and claimed in application S.N. 118,480 filed April 24, 1961. The disclosures of these applications are included herein by reference.

The new poly(bisphenol-A isophthalate terephthalate biphenyldisulfonate) copolymer compositions, within the specific ranges set forth in the present invention, possess a unique and highly desirable combination of physical, chemical and electrical properties together with other long sought attributes of commercial importance. These copolymer compositions which fall within the range of about 5 to about 40 mole percent of sulfonate ester linkage, with correspondingly about 95 to about 60 mole percent of carboxylate ester linkage possess a combination of high tensile strength, high impact and flexural strength, high heat distortion temperature, high melting point and exceptional chemical stability which adapt them for use in the polymer field as films, fibers, molded parts, protective coatings, adhesives, and the like. In view of the remarkable combined balance of properties, it is clear that they are a more versatile and commercially valuable class of polymers than the heretofore disclosed polysulfonate or polycarboxylate polymers.

An almost infinite number of monomer combinations and composition ranges for sulfonate-carboxylate copolymers are possible as indicated by the many examples of various such polymers which are contained herein for reference. These various copolymers may be derived from one or more diphenols reacted with one or more aromatic disulfonyl halides and one or more dicarboxylic acid chlorides.

The aliphatic or aromatic carboxylate ester and aromatic sulfonate ester structural units formed thereby occur in various fashions in the linear copolymer chain. More specifically, the essentially linear copolymers are comprised of recurring (1) sulfonate ester structural units of the formula 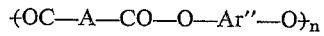 $\{O_2S—Ar—SO_2—O—Ar'—O\}_m$ and (2) carboxylate ester structural units of the formula $$\{OC—A—CO—O—Ar''—O\}_n$$

wherein Ar, Ar', and Ar'' are bivalent organic radicals selected from the group consisting of aromatic mono- and polycarbocyclic containing groups, A is a bivalent organic radical selected from the group consisting of (a) aromatic mono- and polycarbocyclic containing groups, (b) aliphatic and cycloaliphatic groups, and (c) aliphatic-aromatic containing groups, and wherein (a), (b), and (c) may contain hetero atoms other than carbon, and wherein $m$ and $n$ are integers equal to or greater than one, and wherein Ar, Ar', Ar'' and A may be the same or different. These copolymers may be of a random type in which the above-mentioned structural units are propagated along the copolymer chain in a random manner or they may be block copolymers in which one or both of the structural units is itself polymeric, as, for example, where $m$ or $n$ or both are substantially greater than one. Such structures may be achieved, for example, by the formation of an aryl polysulfonate from an aryl disulfonyl halide and a diphenol followed by addition of a dicarboxylic acid chloride and further polycondensation. It is apparent that block structures themselves are susceptible to regular or random arrangements as indicated by the method of preparation.

These compositions comprise linear condensation copolymers prepared typically under interfacial polycondensation conditions from one or more diphenols, one or more aryl disulfonyl halides and one or more dicarboxylic acid chlorides. Essentially any dihydric phenol is useful. The diphenol may be generally represented by Formula I:

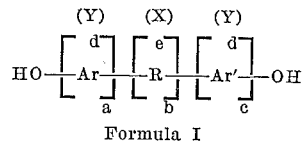

Formula I where R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of ether; carbonyl; amino; a sulfur containing linkage, e.g., sulfide, sulfoxide, sulfonate; a silicon containing linkage; e.g., silane or siloxy, a phosphorous containing linkage; etc. R can also consist of two or more alkylene or alkylidene linkages connected by such groups as aromatic, amino, ether, carbonyl, silane, siloxy, sulfide, sulfoxide, sulfone, a phosphorous containing linkage, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic, or organometallic radicals. The substituents represented by Y include (1) halogen, e.g., chlorine, bromine, fluorine, or (2) ether groups of the general formula OE, where E is a monovalent hydrocarbon radical similar to X or (3) monovalent hydrocarbon groups of the type represented by R or (4) other substituents, e.g., nitro, cyano, etc., said substituents being essentially inert to the polymerization reaction environment.

X is a monovalent hydrocarbon group exemplified by the following: alkyl, such as methyl, ethyl, propyl, isopropyl, butyl, decyl, etc.; aryl groups, such as phenyl, naphthyl, biphenyl, xylyl, tolyl, etc.; aralkyl groups, such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

$d$ is a whole number ranking from 0 to a maximum equivalent to the number of replaceable hydrogens substituted on the aromatic rings comprising Ar and Ar'. $e$ is a whole number ranging from 0 to a maximum controlled by the number of replaceable hydrogens on R. $a$, $b$, and $c$ are whole numbers including 0. When $b$ is not 0, neither $a$ nor $c$ may be 0. Otherwise either $a$ or $c$, but not both, may be 0. Where $b$ is in Formula I and is 0, the aromatic groups are joined by a direct bond between the carbocyclic ring carbon atoms with no connecting alkyl or other linkage.

The hydroxyl and Y substituents on the aromatic groups, Ar and Ar', can be varied in the ortho, meta, or para positions on the aromatic rings and the groups can be in any possible geometric relationship with respect to one another.

Formula I for the diphenols may also be more generally and conveniently depicted by Formula II, wherein the aromatic carbocyclic groups D represents all of the Formula I molecule except the hydroxyl functions:

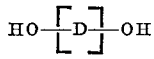

Formula II

Examples of difunctional phenols that have been considered useful include bisphenols of which the following are representative:

2,2-bis-(4-hydroxyphenyl)-propane(bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydroxphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol; dihydroxybiphenyls, such as 4,4'-dihydroxybiphenyl, 2,2'-dihydroxybiphenyl, 2,4'-dihydroxybiphenyl; and dihydroxynaphthalenes, such as 2,6-dihydroxynaphthalene, etc.

Dihydroxyaryl sulfones are also useful, such as bis-(4-hydroxyphenyl)-sulfone; 2,4'-dihydroxyphenyl sulfone; 2,4'-dihydroxy - 5'-chlorophenyl sulfone; 3'-chloro - 4,4'-dihydroxyphenyl sulfone; bis-(4-hydroxyphenyl)-biphenyl disulfone; etc. The preparation of these and other useful dihydroxyarylsulfones is described in United States Patent 2,288,282 issued to Huissmann. Polysulfones as well as sulfones substituted with halogen, nitro, alkyl, and other substituents are also useful. In addition, related sulfides and sulfoxides are applicable.

Dihydroxyaromatic ethers are considered useful and may be prepared by methods found in United States Patent 2,739,171 issued to Linn, and in "Chemical Reviews," 38, 414–417 (1946). Typical of such dihydroxyaryl ethers are the following: 4,4'-dihydroxyphenyl ether; 4,4'-dihydroxy-2,6-dimethylphenyl ether; 4,4'-dihydroxy-3,3'-diisobutylphenyl ether; 4,4'-dihydroxy-3,3'-diisopropylphenyl ether; 4,4'-dihydroxy-3,2'-dinitrophenyl ether; 4,4'-dihydroxy-3,3'-dichlorophenyl ether; 4,4'-dihydroxynaphthyl ether, etc. The many other types of suitable dihydroxyaryl compounds will be apparent to those skilled in the art.

The aromatic disulfonyl chlorides that may be used may be generally represented by the Formula III:

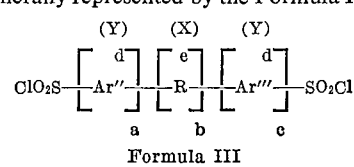

Formula III where Ar" and Ar'" are aromatic groups as defined before for Ar and Ar' in Formula I and where they may be the same or different with respect to one another or with respect to Ar and Ar'. R, Y, X, $a$, $b$, $c$, $d$, and $e$ are defined as for Formula I. (Please refer to the paragraphs relating to the definition of $a$, $b$, $c$, $d$, and $e$ of Formula I for complete understanding of Formula III.) Formula III for the aryl disulfonyl chlorides may also be more generally and conveniently depicted by Formula IV, wherein the aromatic carbocyclic group G represents all of the Formula III molecule except the sulfonyl chloride functions:

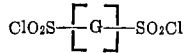

Formula IV

The aromatic disulfonyl halides or chlorides are prepared most conveniently by direct reaction of an aromatic hydrocarbon with chlorosulfonic acid,

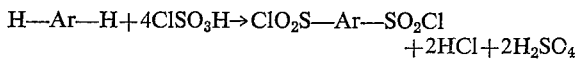

or by the disulfonation of an aromatic compound followed by treatment with a chlorinating agent, such as $PCl_5$, $PCl_3$, $SOCl_2$, or $COCl_2$, by methods which are well known in the art.

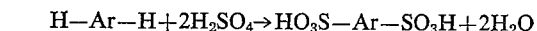
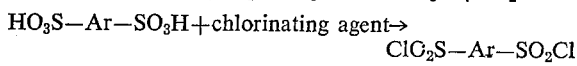

Examples of aromatic disulfonyl chlorides that are useful include: benzenedisulfonyl chlorides of which the following are representative: o-, m-, and p-benzenedisulfonyl chlorides; 1 - chloro - 2,4 - benzenedisulfonyl chloride; 1-bromo-3,5-benzenedisulfonyl chloride; 1-nitro-3,5-benzenedisulfonyl chloride; 1-methyl-2,4-benzenedisulfonyl chloride; 1-methyl-4-chloro-2,6-benzenedisulfonyl chloride; 1-ethyl-2,4-benzenedisulfonyl chloride; 1-2-dimethyl-3,5-benzenedisulfonyl chloride; 1,5-dimethyl-2,4-benzenedisulfonyl chloride; 1,4-dimethyl-2,6-benzenedisulfonyl chloride; 1-methoxy-2,4-benzenedisulfonyl chloride.

Also useful are biphenyldisulfonyl chlorides of which the following are typical: 2,2'-biphenyldisulfonyl chloride; 3,3'-biphenyldisulfonyl chloride; 4,4'-biphenyldisulfonyl chloride; 4,4'-dibromo-3,3'-biphenyldisulfonyl chloride; 4,4'-dimethyl-3,3'-diphenyldisulfonyl chloride.

Arylsulfonedisulfonyl chlorides, such as 3,3'-phenylsulfonedisulfonyl chloride, are useful as are diarylalkane compounds typified by 4,4'-diphenylmethane-disulfonyl chloride; 2,2-bis-(4-phenylsulfonyl chloride)-propane; etc.

Aryl ether disulfonyl chlorides, such as 4,4'-phenyletherdisulfonyl chlorides; 2,4'-phenyletherdisulfonyl chloride; 4,4'-biphenyletherdisulfonyl chloride, etc., are applicable as are naphthalene and anthracene derivatives, such as the following: 1,3-naphthalenedisulfonyl chloride; 2,6-naphthalenedisulfonyl chloride; 1-chloro-2,7-naphthalenedisulfonyl chloride; 1-chloro-3,5-naphthalenedisulfonyl chloride; 1-nitro-3,6-naphthalenedisulfonyl chloride; 2-ethoxyl-1,6-naphthalenedisulfonyl chloride; 1,5-anthracenedisulfonyl chloride; 1,8-anthracenedisulfonyl chloride; etc.

Numerous other types of suitable aromatic disulfonyl chlorides are apparent to those skilled in the art.

The dicarboxylic acid chlorides useful for the preparation of copolyesters may be generally represented by Formula V:

Formula V wherein A is an alkylene, alkylidene, or cycloaliphatic group in the same manner as set forth in R in Formula I above; an alkylene, alkylidene or cycloaliphatic group containing ethylenic unsaturation; an aromatic group such as phenylene, naphthylene, biphenylene, substituted phenylene, etc.; two or more aromatic groups connected through non-aromatic groups such as those defined by R in Formula I; or an aralkyl group such as tolylene, xylylene, etc. A may also be a direct covalent linkage between COCl groups as in oxalyl chloride.

The dicarboxylic acid chlorides are conveniently prepared by the interaction of a dicarboxylic acid with a chlorinating agent, such as $PCl_5$, $PCl_3$, $SOCl_2$, etc.

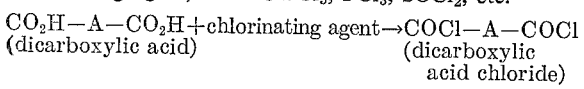

Examples of dicarboxylic acid chlorides that are useful include aliphatic and cycloaliphatic dicarboxylic acid chlorides of which the following are representative: malonyl chloride; oxalyl chloride; succinyl chloride; glutaryl chloride; adipyl chloride; pimelyl chloride; suberyl chloride; azelayl chloride; sebacyl chloride; cis- and trans-1,4-cyclohexanedicarboxylic acid chloride; cis- and trans-1,3-cyclobutanedicarboxylic acid chloride; and cis- and trans-1,3-cyclohexanedicarboxylic acid chloride, etc.

Also useful are aromatic dicarboxylic acid chlorides of which the following are typical: phthalyl chloride; isophthalyl chloride; terephthalyl chloride; 4,4'-biphenyldicarboxylic acid chloride; 4,4'-diphenylmethanedicarboxylic acid chloride; 2,2-bis-(4-carboxychlorophenyl)-propane; etc.

In addition to aliphatic and aromatic, aliphatic-aromatic dicarboxylic acid chlorides, such as homophthalyl chloride or o-, m-, or p-phenylene diacetyl chlorides, etc., are useful. Polynuclear aromatic acid chlorides, such as diphenic acid chlorides, 1,4-naphthalic acid chloride, 3,3'-diphenyletherdicarboxylic acid chloride; 4,4'-diphenyletherdicarboxylic acid chloride and the like are also useful.

Unsaturated dicarboxylic acid chlorides, such as dihydrophthalyl chloride and fumaryl chloride are useful as are aliphatic carboxylic acid chlorides containing hetero atoms in their aliphatic chain, such as diglycollic or thiodiglycollic. Additionally, cycloaliphatic carboxylic acid chlorides such as the tetrahydrophthalic acid chlorides, nadic acid chloride, chlorendic acid chloride, etc., may be used.

Numerous other types of suitable dicarboxylic acid chlorides are apparent to those skilled in the art.

Although these copolymers may be prepared by various conventional condensation procedures, it is normally preferred to conduct the polycondensation via an interfacial polymerization technique. Polymerizations may be carried out at or near room temperature by mixing a basic aqueous solution of an alkali metal salt of one or more diphenols with one or more dicarboxylic acid chlorides and one or more aryl disulfonyl chlorides contained in an inert organic solvent. The addition of a basic organic catalyst such as a quaternary ammonium salt or a suitable amine is useful in promoting higher molecular weights. The reaction mixtures are preferably stirred vigorously for varying periods of time and the copolymers precipitated or coagulated by any suitable means, as for example, by addition to a non-solvent such as isopropyl alcohol. The precipitated copolymers are generally washed to remove any residual impurities and dried.

The organic solvent utilized for the diacid chloride mixture may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range from less than 1 wt. percent to more than 20 wt. percent being limited at the high concentrations only by the increasing difficulties encountered in handling the extremely viscous media. Polymerization time may be varied from less than five minutes to more than three hours depending upon the reactivity of the copolymer reactants and the molecular weight desired. Extremely short polymerization periods will generally result in lower molecular weight copolymers as compared with longer polymerization times which give higher molecular weights. Although it is preferred to use approximately equimolar quantities of diphenols and diacid chlorides, the reactivity of the diacid chlorides and the reaction conditions are such that the use of exact stoichiometry is not critical to the attainment of relatively high molecular weights. Thus, in fact, block copolymers are readily obtained using incremental reactant addition. The mode of addition of the diacid chlorides to the diphenols is therefore governed by the nature of the copolymer desired and it is possible to add incrementally or to batch-mix the reactants if desired. The various diacid chlorides need not be added together but may be added one at a time or as alternate increments, again depending upon the polymer structure sought, i.e., random, random-block, block-block, etc. In addition, it is also possible to invert the order of addition of reactants and add the diphenols to the diacid chlorides.

Although random copolymers (consisting of structural units propagated along the polymer chain in an essentially random fashion) are readily prepared, block copolymers of tailored structure may also be easily prepared (in which at least one of the structural units in the copolymer chain is itself polymeric). The diphenol-disulfonyl chloride-dicarboxylic acid chloride reaction is a particularly convenient method for the preparation of block copolymers. Thus, block copolymers may be prepared, for example, by reacting one or more of the aryl disulfonyl chlorides initially with one or more of the dihydric phenols followed by reaction with one or more of the dicarboxylic acid chlorides.

Alternatively, one or more of the dicarboxylic acid chlorides may be reacted with one or more of the diphenols followed by further reaction with one or more of the aryl disulfonyl chlorides. Similarly, block-block structures may be prepared, as for example, by mixing a polymeric diphenol-dicarboxylic acid chloride reaction mixture and a polymeric diphenol-aryl disulfonyl chloride reaction mixture with or without further addition of disulfonyl or carboxylic acid chlorides or diphenols.

The basic organic catalyst also may be added initially or during the course of the polycondensation, or may be added incrementally during the reaction. Although benzyltrimethylammonium chloride is a particularly effective catalyst, other quaternary salts and suitable amines are effective. The amount of catalyst added may vary from less than 0.01 weight percent to more than 1.0 weight percent. Although the polymerization temperature may be varied over a wide range, as for example, from less than 0° C. to more than 100° C., it is most convenient to conduct the reaction at or about room temperature, i.e., 25° C.

A copolymer derived from a diphenol, an aryl disulfonyl chloride and a dicarboxylic acid chloride, will, therefore, comprise the following formulae, VI sulfonate ester structural units, and VII carboxylate ester structural units in the polymer chain:

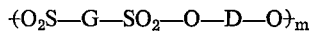

Formula VI

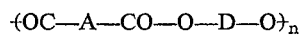

Formula VII where the radicals A, D, and G are as hereinbefore defined and D in Formula VI may be the same or different from D in Formula VII; and where $m$ and $n$ may be any whole number equal to or greater than one. The order and relative proportions of VI and VII may be widely varied as indicated above. It is to be noted that (1) the aromatic carbocyclic containing groups G are derived from aryl disulfonyl chlorides and are bonded through aromatic ring carbon atoms directly to sulfonate group sulfur atoms, (2) the aromatic carbocyclic containing groups D are derived from diphenols and are bonded directly through aromatic ring carbon atoms to sulfonate group or carboxylate group linking oxygen atoms and (3) the aliphatic or aromatic carbocyclic containing groups A are derived from aliphatic or aromatic dicarboxylic acid chlorides and are bonded directly through aliphatic carbon atoms or aromatic ring carbon atoms to carboxylate group carbon atoms.

The use of one or more bisphenols in combination with one or more aromatic disulfonyl chlorides and one or more dicarboxylic acid chlorides results in copolymer compositions whose properties may be widely varied according to the structure and relative proportions of the monomers used. However, the combination of high softening temperature, high impact strength, high heat distortion temperature, and ductility, as well as other desirable attributes of significant commercial value has not heretofore been achieved in a single copolymer system. Indicative of this, the following examples are illustrative of the preparation of a variety of sulfonate-carboxylate copolymers from diphenols, aryl disulfonyl chlorides, and aliphatic or aromatic dicarboxylic acid chlorides.

Example 1

This example illustrates the reaction of bisphenol-A with 1,3-benzenedisulfonyl chloride and sebacyl chloride, under a variety of conditions and varying proportions:

A. 2.752 g. 1,3-benzenedisulfonyl chloride (10 m. mole, 19.1 mole percent) and 10.134 g. sebacyl chloride (42.3 m. mole, 80.9 mole percent) in 175 ml. of methylene chloride were rapidly added to a stirred solution of 11.939 g. (52.3 m. mole) of bisphenol-A, 10 drops of a 60% aqueous solution of benzyltrimethylammonium chloride, 104.0 ml. of 0.9821 N sodium hydroxide and 46 ml. of water. During the mixing and for 45 additional minutes the temperature of the mixture was kept at 0–5° C. and the pH was kept above 10 by the addition of small amounts of 0.9812 N sodium hydroxide when required. The temperature was then raised to 26° C. and kept at 26+1° C. for an additional 45 minutes. Methylene chloride (50 ml.) was added to the reaction mixture in order to decrease its viscosity and the polymer was coagulated after neutralization with HCl, by addition to the reaction mixture of a large excess of isopropanol. On analysis the product had a softening temperature range of 63–87° C. and its intrinsic viscosity, measured in 1,1,2,2-tetrachloroethane, was 0.78 dl./g.

B. 3.934 g. 1,3-benzenedisulfonyl chloride (14.3 mmoles, 28.6 mole percent) in 30 ml. of methylene chloride was added at 25° C. to a well stirred solution of 11.414 g. (50 mmoles) of bisphenol-A, 105 ml. 0.9812 N NaOH and 10 drops of a 60% aqueous solution of benzyltrimethylammonium chloride. After 30 minutes a solution of 8.553 g. (35.7 mmoles, 71.4 mole percent) of sebacyl chloride in 70 ml. methylene chloride was added to the reaction mixture. The whole was stirred vigorously for 30 minutes. Methylene chloride (150 ml.) was added and the mixture neutralized with aqueous HCl. The polymer was isolated as in Example IA and had a softening temperature range of 111–179° C. and an intrinsic viscosity of 1.30 dl./g.

C. A solution of 6.658 g. (24.2 mmoles, 48.4 mole percent) 1,3-benzenedisulfonyl chloride was added to a well-stirred solution of 11.414 g. (50 mmoles) bisphenol-A, 105 ml. 0.9812 N NaOH and 10 drops of a 60% aqueous solution of benzyltrimethylammonium chloride. After 30 minutes a solution of 7.099 g. (25.8 mmoles, 51.6 mole percent) sebacyl chloride in 50 ml. methylene chloride was added to the reaction mixture. The whole was stirred vigorously for 25 minutes, then 150 ml. $CH_2Cl_2$ was added to the thick slurry. After neutralization of the reaction mixture with aqueous HCl, the polymer was isolated as in Example IA. The copolymer had a softening temperature range of 111–133° C. and an intrinsic viscosity of 1.58 dl./g.

D. A solution of 6.873 g. (25.0 mmoles, 62.6 mole percent) 1,3-benzenedisulfonyl chloride in 50 ml. methylene chloride was added to a well-stirred solution of 11.414 g. (50 mmoles) bisphenol-A, 105 ml. 0.9812 N NaOH and 10 drops of benzyltrimethylammonium chloride. After 30 minutes a solution of 3.592 g. (15.0 mmoles, 37.4 mole percent) of sebacyl chloride in 50 ml. methylene chloride was added to the reaction mixture, which was then stirred for 80 additional minutes. Methylene chloride (150 ml.) was added, the mixture was neutralized with aqueous HCl and the product isolated as in Example IA. The copolymer had a sofening temperature range of 83–118° C. and an intrinsic viscosity of 1.04 dl./g. It is noteworthy that a high molecular weight polymer was obtained even through the total amount of diacid chlorides employed was only 80 mole percent of the bisphenol-A.

Table 1, below, tabulates the various proportions and analyses of the products of Example I.

TABLE I

| Copolymer | Diacids, Mole Percent | | Molar Proportions, Diacids to bisphenol-A, Percent | Softening Temperature, ° C. | Intrinsic Viscosity, dl./g. |
|---|---|---|---|---|---|
| | Disulfonic | Dicarboxylic | | | |
| A | 19.1 | 80.9 | 100 | 63–87 | 0.78 |
| B | 28.6 | 71.4 | 100 | 111–179 | 1.30 |
| C | 48.4 | 51.6 | 100 | 111–133 | 1.58 |
| D | 62.6 | 37.4 | 80 | 83–118 | 1.04 |

Example 2

A solution of 5.063 g. (18.4 mmoles, 36.8 mole percent) of 1,3-benzenedisulfonyl chloride in 35 ml. methylene chloride was added to a well-stirred solution of 11.414 g. (50 mmoles) bisphenol-A, 104 ml. of 0.9812 N NaOH and 10 drops of a 60% solution of benzyltrimethylammonium chloride. After 15 minutes, 6.421 g. (31.6 mmoles, 63.2 mole percent) isophthalyl chloride in 65 ml. methylene chloride was added to the reaction mixture. The whole was stirred at room temperature for 45 minutes, 150 ml. methylene chloride were added and the reaction mixture acidified with aqueous HCl. The polymer was isolated as in Example IA. The copolymer (92% yield) had a softening temperature range of 115–218° C. and an intrinsic viscosity of 0.86 dl./g.

Example 3

A solution of 3.626 g. (13.18 mmoles, 25 mole percent) 1,3-benzenedisulfonyl chloride in 30 ml. methylene chloride was added at 25° C. to a stirred solution of 12.037 g. (52.73 mmoles) of bisphenol-A, 97.7 ml. of 1.0797 N NaOH and 10 drops of a 60% solution of benzyltrimethylammonium chloride. The pH of the reaction mixture was kept throughout above 10 by addition of small amounts of 1.0797 N NaOH. After 30 minutes 6.130 g. (39.55 mmoles, 75 mole percent) of succinyl chloride in 70 ml. methylene chloride were added to the reaction mixture and the whole was stirred for one hour. The polymer was isolated as in Example IA. The copolymer (98% yield) had a softening temperature range of 128–163° C. and an intrinsic viscosity of 0.93 dl./g.

Example 4

A solution of 3.395 g. (12.34 mmoles, 20 mole percent) 1,3-benzenedisulfonyl chloride in 25 ml. methylene chloride was rapidly added to a solution of 14.089 g. (61.72 mmole) bisphenol-A, 114.3 ml. of 1.0797 N NaOH and 10 drops of a 60% solution of benzyltrimethylammonium chloride. The reaction mixture was agitated for 30 minutes, then 7.553 g. (49.38 mmoles, 80 mole percent) fumaryl chloride in 75 ml. methylene chloride was added with stirring. The pH of the mixture dropped below seven and was kept above 10 by addition of small amounts of 1.0797 N NaOH. The whole was stirred for 40 minutes, neutralized with aqueous HCl and added to a large excess of isopropanol. The polymer was collected by filtration, washed with water and ispropanol and dried in vacuo. The copolymer (92% yield) had a softening temperature range of 107–159° C. and an intrinsic viscosity of 0.51 dl./g. It was soluble in methylene chloride, tetrachloroethane, pyridine and cyclohexanone.

Example 5

A solution of 3.967 g. (14.4 mmoles, 28.8 mole percent) 1,3-benzenedisulfonyl chloride in 30 ml. methylene chloride was added at 25° C. to a well-stirred solution of 8.510 g. (50 mmoles) 2,2-bis-(3-chloro-4-hydroxy)-propane, 92.6 ml. of 1.0797 N NaOH and 10 drops of a 60% aqueous solution of benzyltrimethylammonium chloride. After 30 minutes, 8.508 g. (35.6 mmoles, 71.2 mole percent) sebacyl chloride in 70 ml. methylene chloride was added to the above mixture. The whole was then stirred for 90 additional minutes, and the pH was kept above 10 by the addition of small amounts of the hydroxide when required. The reaction mixture was then neutralized with aqueous HCl and the polymer isolated as in Example 4. The copolymer had a softening temperature range of 70–103° C. and an intrinsic viscosity of 1.35 dl./g.

Example 6

A solution of 4.646 g. (16.9 mmoles, 30 mole percent) 1,3-benzenedisulfonyl chloride in 30 ml. of methylene chloride was added at 25° C. to a well-stirred solution of 16.728 g. (56.3 mmoles) 2,2-bis-(3-chloro-4-hydroxy)-propane, 104.3 ml. of 1.0797 N NaOH and 10 drops of a 60% aqueous solution of benzyltrimethylammonium chloride. After 30 minutes 6.026 g. (39.4 mmoles, 70 mole percent) fumaryl chloride in 70 ml. methylene chloride was added to the above mixture. The whole was then stirred for an addition 1½ hours, and the pH was kept above 10 by addition of small amounts of the NaOH. After neutralization with aqueous HCl, the reaction mixture was added to a large excess of isopropanol. The polymer was collected by filtration, washed with water and isopropanol and dried in vacuo. The copolymer had a softening temperature range of 87–143° C. and an intrinsic viscosity of 0.64 dl./g. The polymer was completely soluble in methylene chloride, dioxane, pyridine, and cyclohexanone.

Example 7

A solution of 6.12 g. (40 mmoles, 80 mole percent) of fumaryl chloride and 3.66 g. (10 mmoles; 20 mole percent) of 4,4¹-phenyletherdisulfonyl chloride in 150 ml. of methylene chloride was added dropwise over 18 minutes to a well-stirred solution of 11.414 g. (50 mmoles) of bisphenol-A, 8 drops of a 60% aqueous solution of benzyltrimethylammonium chloride and 126 ml. of 0.809 N LiOH. The reaction mixture was allowed to stir vigorously for one hour; the temperature was kept at 0–5° C. throughout. The pH was maintained above 10 by the addition of small amounts of LiOH when required. At the end of the reaction, 6 N sulfuric acid was added until the mixture was approximately neutral and the copolymer was isolated as in Example 4. The copolymer had an intrinsic viscosity, measured in 1,1,2,2-tetrachloroethane, of 0.53 dl./g.

Various copolymers derived from dicarboxylic acid chlorides, disulfonyl chlorides and bisphenol-A were prepared by the procedure described in Example 7. Some of these copolymers could be compression molded, and solutions in methylene chloride in some cases were cast into films.

TABLE II

| Ex. No. | Diacid [1] Chlorides, Mole Percent | Intrinsic Viscosity | Ultimate Tensile at 25° C., p.s.i. | Micro Heat Distortion, ° C. | Dynstat Impact Strength at 25° C., kg. cm./cm.² |
|---|---|---|---|---|---|
| 7 | FC (80), PEDSC (20) | 0.53 | 7,200 | 109 | |
| 8 | FC (80), BDSC (20) | 0.37 | 7,200 | 115 | |
| 9 | IPC (58.5), TPC (31.5), PEDSC (10) | 0.63 | 9,200 | | 8 |
| 10 | IPC (57.2), TPC (30.8), FC (2), PEDSC (10) | 0.55 | 9,400 | | 12 |
| 11 | IPC (52), TPC (28), FC (10), PEDSC (10) | 0.76 | 9,900 | | 9 |
| 12 | IPC (40), ADC (40), BPDSC (20) | 1.0 | 7,200 | 131 | 12 |
| 13 | TPC (40), ADC (40), BPDSC (20) | 1.15 | 5,900 | 136 | 46 |

[1] Code—End of Table III.

TABLE III

| Ex. No. | Diacid [1] Chlorides, Mole Percent | Intrinsic Viscosity | Ultimate Tensile at 25° C., p.s.i. | Micro Heat Distortion, ° C. | Dynstat Impact Strength at 25° C., kg. cm./cm.[2] |
|---|---|---|---|---|---|
| 14 | BDSC (20), SBC (80) | 0.78 | 6,000 | 48 | 9 |
| 15 | BCSC (90), SBC (10), [BPA (90), DHDPE (10)]. | 0.88 | 6,300 | 99 | |
| 16 | BDSC (20), SBC (80) | 0.78 | 6,000 | 48 | 9 |
| 17 | PEDSC (50), IPC (50) | 0.67 | 6,200 | 161 | 6.2 |
| 18 | BDSC (50), IPC (50) | 0.52 | 5,600 | 90 | 3.5 |
| 19 | BDSC (10), TPC (70), FC (20) | 0.64 | 7,000 | 139 | |

[1] FC = fumaryl chloride.
PEDSC = 4,4'-phenyletherdisulfonyl chloride;
BDSC = 1,3-benzenedisulfonyl chloride.
IPC = isophthalyl chloride.
TPC = terephthalyl chloride.
ADC = adipyl chloride.
DHDPE = 4,4'-dihydroxyphenyl ether.
SBC = sebacyl chloride.
BPA = bisphenol-A.

The preparation of block structures is demonstrated by the following examples:

Example 20

A solution of 8.254 g. (30 mmoles) of 1,3-benzenedisulfonyl chloride in 175 ml. of methylene chloride was added rapidly to a solution of 6.848 g. (30 mmoles) of bisphenol-A, seven drops of a 60% aqueous solution of benzyltrimethylammonium chloride and 61.5 mmoles of NaOH in 75 ml. of water. The reaction mixture was stirred vigorously; the temperature was kept at 2–3° C. Samples were periodically removed from the flask and the polymer immediately precipitated by addition to isopropanol. After thorough washing with water and isopropanol and drying, the intrinsic viscosity of the polymers was determined in methylene chloride at 25° C. The results are reported in Table IV.

TABLE V

| Time (Min.): | Intrinsic Viscosity |
|---|---|
| 10 | 0.05 |
| 20 | 0.25 |
| 30 | 0.34 |
| 48 | 0.74 |
| 60 | 0.81 |
| 90 | 1.10 |
| 120 | 1.21 |
| 180 | 1.40 |
| 240 | 1.67 |

As the above data indicates, the sulfonate polymer which is produced during an interfacial polycondensation reaction contains reactive groups which at any given time are "living" and thereby capable of reacting further. Similarly, carboxylate polymers may be prepared as "living" blocks for copolymerization as illustrated by the following data in Table V for the reaction between bisphenol-A and sebacyl chloride. A great variety of block and block-block copolymers may be prepared by varying the order in which the various monomers are combined.

TABLE IV

| Time (Min.): | Intrinsic Viscosity |
|---|---|
| 30 | 0.34 |
| 60 | 0.67 |
| 120 | 0.77 |

Copolymers of the same composition which have been prepared by different methods often exhibit striking differences in their physical and chemical properties, such as impact strength, heat distortion temperature, tensile strength, solubility, physical appearance, etc. The following examples will illustrate the preparation of block and random copolymers of the same monomer composition and compare their properties.

Example 21

A solution of 27.515 g. (100 mmoles; 50 mole percent) of 1,3-benzenedisulfonyl chloride in 500 ml. of methylene chloride was added over 40 minutes to a solution of 45.66 g. (200 mmoles) of bisphenol-A, 415 mmoles of LiOH and 1 ml. of a 60% aqueous solution of benzyltrimethylammonium chloride in 1 liter of water. The reaction mixture was kept at 0–5° C. throughout. After 40 minutes, a solution of 18.304 g. (100 mmoles; 50 mole percent) of adipyl chloride in 500 ml. of methylene chloride was added over a 20-minute period to the reaction mixture. The whole was stirred for two additional hours, then the block copolymer was isolated by the method described in Example 7. Property data are summarized in Table VI.

Example 22

The amounts of materials employed are the same as in Example 21. A solution of 1,3-benzenedisulfonyl chloride and adipyl chloride in one liter of methylene chloride was added to the aqueous solution containing the bisphenol-A, LiOH and benzyltrimethylammonium chloride over a 52-minute period. The reaction mixture was stirred for two additional hours. The copolymer, which was essentially random, was isolated as in the previous example. Property data are summarized in Table VI.

TABLE VI

| Ex. No. | Intrinsic Viscosity | Micro Heat Distortion Temp., ° C. | Dynstat Impact Strength, kg. cm./cm.[2] | Appearance of Molded Polymer |
|---|---|---|---|---|
| 21 | 0.67 | 100 | 3.6 | Opaque. |
| 22 | 0.45 | 89 | 3.4 | Clear—transparent. |

The above examples are illustrative of the difficulty in obtaining a combination of monomers which produces aromatic sulfonate-carboxylate copolymers possessing a combination and balance of commercially important physical and chemical properties. In particular, it is to be noted that although some copolymers may exhibit moderately high heat distortion temperatures, this is usually combined with low impact strength or brittleness. Similarly, higher impact copolymers may exhibit low tensile strength or heat distortion temperatures.

The copolymers of the present invention provide in combination the most desirable properties for commercial use. The copolymers of the instant invention are distinguished by combining high impact strength, high heat distortion temperatures, outstanding chemical stability, high tensile strength, ductility and high temperature strength.

Briefly described, the present invention is directed to copolymers derived from the reacting of from about 5 to 40 mole percent of 4,4-biphenyldisulfonyl chloride and correspondingly from about 95 to about 60 mole percent of a mixture of isophthalyl chloride and terephthalyl chloride with bisphenol-A. The combination of these monomers produces copolyesters comprising from about 5 to about 40 mole percent sulfonate ester structural units of the formula

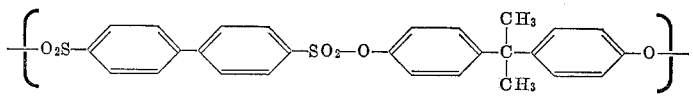

and correspondingly from about 95 to about 60 mole percent carboxylate ester structural units of the formulas

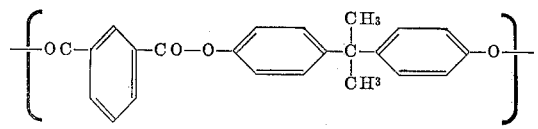

and

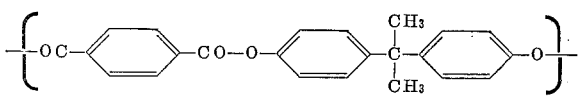

The isophthalate-terephthalate mole ratio may range from about 5 to about 95 mole percent isophthalate with correspondingly from about 95 to about 5 mole percent terephthalate.

in 250 ml. distilled water) was charged to a 1 liter glass reactor and equipped with a high shear agitator. The solution was cooled to about 20° C. and 12 drops of a 60% aqueous benzyltrimethylammonium chloride was added. To this aqueous phase there was added very rapidly with vigorous agitation an organic phase consisting of a mixture of 4,4'-biphenyldisulfonyl chloride and isophthalyl and terephthalyl chlorides (total of 0.10 mole of acid chlorides) dissolved in 250 ml. of methylene chloride. After 20 minutes of vigorous stirring, the development of a high molecular weight copolymer was evidenced by a great increase in the viscosity of the reaction mixture. The copolymer was isolated by precipitation with methanol in a high shear mixer and was purified by repeated washing with methanol and with water. The product was dried at about 75° C. in a vacuum oven for a period of at least 16 hours. The physical properties of the copolymers are summarized in Tables VII and VIII and FIGURE 1.

TABLE VII

| Example | 23 | 24 | 25 | 26 | 27 | 28 | 29 | 30 | 31 | Comparative Commercial High-Performance Thermoplastics [1] | | | |
|---|---|---|---|---|---|---|---|---|---|---|---|---|---|
| | | | | | | | | | | 32 | 33 | 34 | 35 |
| Isophthalyl Chloride, mole percent | 50.0 | 47.5 | 45.0 | 40.0 | 35.0 | 30.0 | 25.0 | 20.0 | 12.5 | | | | |
| Terephthalyl Chloride, mole percent | 50.0 | 47.5 | 45.0 | 40.0 | 35.0 | 30.0 | 25.0 | 20.0 | 12.5 | | | | |
| 4,4'-biphenyldisulfonyl-chloride, mole percent | 0 | 5.0 | 10.0 | 20.0 | 30.0 | 40.0 | 50.0 | 60.0 | 75.0 | | | | |
| Intrinsic Viscosity, Measured in Tetrachloroethane, dl./g. | 1.5 | 2.5 | 1.5 | 1.0 | 0.9 | 1.7 | 1.0 | 1.6 | 1.0 | | | | |
| Impact Strength (Dynstat), kg. cm./cm.$^2$ | 41.0 | 57.0 | 45.0 | 35.0 | 35.0 | 31.0 | 17.0 | 17.0 | 9.5 | 16.0 | 22.0 | 27.0 | 45.0 |
| Stability (Weight Change, percent, ⅛″ x ¼″ x ½″ Sample): | | | | | | | | | | | | | |
| 10% NaOH, Refluxed 20 Hours | −29.4 | −18.0 | −21.0 | −8.3 | −6.0 | −1.4 | −1.0 | −0.5 | −0.3 | N.C. | −49.0 | N.C. | −17.0 |
| 10% NH₃, 25° C., 1 week | −1.9 | +0.8 | +0.4 | +0.4 | +0.3 | +0.2 | +0.2 | +0.2 | +0.4 | N.C. | N.C. | N.C. | −67.0 |
| 15% HCl, Refluxed 1 week | | | | +0.7 | +0.6 | +1.1 | +1.1 | +0.6 | | N.C. | −100 | −100 | N.C. |
| Percent Weight Loss in Air, 1 week, 200° C. | | | | 0.6 | | | 0.4 | | 1.6 | 2.6 | 100 | 5.0 | 0.5 |
| Heat Distortion Temperature, ° C., 264 p.s.i. (Micro-Test) (⅛″ x ¼″ x ½″ Sample) | 202 | 196 | 199 | 191 | 188 | 189 | 183 | 181 | 176 | 93 | 100 | 66 | 138 |
| Ultimate Tensile Strength, p.s.i.: | | | | | | | | | | | | | |
| 25° C. | | | | 7,500 | 8,200 | 5,500 | 7,900 | 7,500 | 9,500 | 5,600 | 8,000 | 10,000 | 8,600 |
| 175° C. | | | | 4,100 | 4,300 | 2,900 | 2,600 | 2,400 | | N.S. | N.S. | N.S. | N.S. |

[1] 32 ABS Polymer. 33 Polyacetal. 34 Polyamide. 35 Polycarbonate.
N.C.—No Change. N.S.—No Strength.

The compositions of the present invention may be prepared as those copolymers set forth in the examples above or by other polycondensation procedures which are capable of producing high molecular weights such as solution polyesterification. The following examples are provided to clearly define our invention and denote the criticality of the mole ratio of reactans required to produce an optimum balance of properties. These examples illustrate the preparation of sulfonate-carboxylate copolymers from 2,2-bis(4-hydroxyphenyl)-propane (bisphenol-A), reacted with 4,4'-biphenyldisulfonyl chloride, isophthalyl chloride and terephthalyl chloride over a wide range of compositions.

The following typical preparative procedure was used. A solution of bisphenol-A (0.10 mole; 22.8 g.) in aqueous caustic (0.22 mole; 8.8 g. sodium hydroxide dissolved

TABLE VIII

[65 mole percent isophthalyl chloride/terephthalyl chloride and 35 moles percent 4,4'-biphenyldisulfonyl chloride reacted with 2,2-bis-(4-hydroxyphenyl)-propane]

| Isophthalyl Chloride:Terephthalyl Chloride Ratio | 4:1 | 2:1 | 1:2 | 1:4 |
|---|---|---|---|---|
| Ultimate Tensile Strength, p.s.i., 25° C. | 7,500 | 6,500 | 7,500 | 8,400 |
| Impact Strength (Dynstat), kg. cm./cm.$^2$ | 21 | 26 | 22 | 11 |
| Heat Distortion Temperature (Micro), ° C. | 176 | 184 | 189 | 187 |
| Intrinsic Viscosity (In solution of Tetrachloroethane, dl./g.) | 1.1 | 2.1 | 1.8 | 1.5 |

Comparing the chemical stability of the copolymers of this invention with polyacetal and polycarbonate, it will be appreciated that polyacetal and polycarbonate have dramatically inferior caustic stability. This poor stability is typical of aldehyde polymers and polyesters. The copolymers of this invention remain unaffected after one week in aqueous ammonia whereas polycarbonate is virtually destroyed. Acid hydrolysis, i.e., boiling aqueous HCl, does not effect the copolymers of this invention whereas polyacetal and polyamide are completely destroyed. Table VIII illustrates how the properties of polymers of this invention are changed by varying the isophthalate-terephthalate ratio. For example, the impact strength is improved as a 1:1 ratio is approached. Also, there is a slight increase in heat distortion temperature as the terephthalate content is increased.

Additionally, the copolymers of this invention show good stress crack resistance both under thermal and solvent stress crack conditions compared with the stress crack resistance of compositions outside the 5 to 40 mole percent sulfonate range as well as polycarbonate and ABS polymers.

From the foregoing description and examples, it will be apparent that the copolymer compositions of this invention, i.e., poly(bisphenol-A isophthalate terephthalate biphenyldisulfonate) within the range of from about 5 to about 40 mole percent of 4,4'-biphenyldisulfonate ester linkages and correspondingly from about 95 to about 60 mole percent isophthalate-terephthalate ester linkages are unique, versatile and highly useful polyesters. In particular, the stability with respect to hydrolysis or aminolysis combined with high impact strength and high heat distortion temperature is without precedent in polyester technology.

The extremely good chemical stability of the polymers of this invention is important in all applications requiring exposure to moisture or humidity at elevated temperatures where retention of physical, electrical and chemical properties is required. The combination of high softening temperature, desirable strength characteristics, and thermal and chemical stability make the polymers of this invention useful as thermoplastic molding compounds for the fabrication of molded parts, gaskets, tubing, gears, casings, and the like either as virgin resin or combined with such fillers as silica, carbon black, wood flour or the like. Films are useful as packaging material, containers, covers, liners, electrical insulation, recording tapes, photographic film base, pipe wrappings, etc. Films and fibers may be oriented or drawn at suitable temperatures to permit enhancement of strength properties such as tensile and flexural strengths. Fibers may be readily formed by melt or solution spinning and are useful as yarn, thread, bristle, rope and the like. The compositions of this invention may be readily pigmented or dyed and suitable stabilizers and plasticizers as are known in the art may be incorporated. Alloying or admixture with other resinous materials may also be readily accomplished. The very desirable combination of properties found in the present compositions make them useful also for surface coating in paints, varnishes and enamels and their powerful adhesive qualities render them particularly useful as adhesives for plastic, rubber, metal, glass or wood parts.

Obviously, many modifications and variations of the invention hereinbefore set forth may be made without departing from the spirit and scope thereof and therefore only such limitations should be imposed as are indicated in the appended claims.

What is claimed is:

1. A linear copolymer composition having an intrinsic viscosity in excess of 0.3 dl./g. when measured in tetrachloroethane at 25° C. comprising from about 5 to about 40 mole percent bisphenol sulfonate ester structural units of the formula

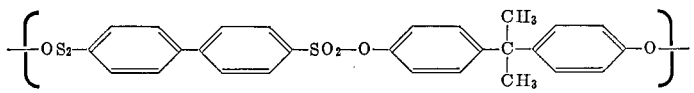

and correspondingly from about 95 to about 60 mole percent bisphenol carboxylate ester structural units of the formulas

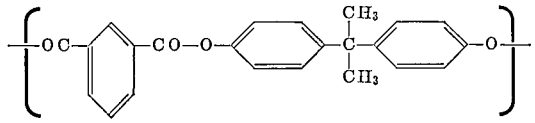

and

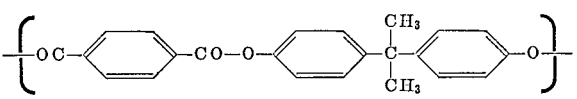

2. The copolymer composition of claim 1 wherein the carboxylate ester structural units occur in substantially equimolar amounts.

References Cited by the Examiner

FOREIGN PATENTS 585,882   6/1960   Belguim.

WILLIAM H. SHORT, *Primary Examiner.*

J. C. MARTIN, *Assistant Examiner.*